United States Patent
Wang et al.

(10) Patent No.: US 7,821,783 B2
(45) Date of Patent: Oct. 26, 2010

(54) DOUBLE HINGE ASSEMBLY AND ELECTRONIC DEVICE USING THE SAME

(75) Inventors: Jin-Xin Wang, Shenzhen (CN); Chao-Zhong Fu, Shenzhen (CN); Jian Li, Shenzhen (CN); Lian-Cheng Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 24 days.

(21) Appl. No.: 12/118,749

(22) Filed: May 11, 2008

(65) Prior Publication Data

US 2009/0147458 A1     Jun. 11, 2009

(30) Foreign Application Priority Data

Dec. 6, 2007    (CN) .................. 2007 1 0202903

(51) Int. Cl.
- *G06F 1/16* (2006.01)
- *H05K 5/00* (2006.01)
- *H05K 7/00* (2006.01)

(52) U.S. Cl. .................. 361/679.27; 361/679.26
(58) Field of Classification Search ............ 361/679.21, 361/679.26, 679.27; 16/367
See application file for complete search history.

(56) References Cited

U.S. PATENT DOCUMENTS

| | | | | |
|---|---|---|---|---|
| 5,559,670 A * | 9/1996 | Flint et al. | ............. | 361/679.27 |
| 6,005,767 A * | 12/1999 | Ku et al. | ................ | 361/679.27 |
| 6,742,221 B2 * | 6/2004 | Lu et al. | ................ | 361/679.27 |
| 6,798,646 B2 * | 9/2004 | Hsu | ...................... | 361/679.06 |
| 6,883,206 B2 * | 4/2005 | Yang et al. | ............. | 361/679.27 |
| 6,972,947 B2 * | 12/2005 | Duncan | ................. | 361/679.21 |
| 6,985,356 B2 * | 1/2006 | Wang | ..................... | 361/679.06 |
| 7,096,540 B2 * | 8/2006 | Watanabe et al. | ............. | 16/367 |
| 7,215,538 B1 * | 5/2007 | Chen et al. | ............. | 361/679.06 |
| 7,272,423 B2 * | 9/2007 | Satoh et al. | .............. | 455/575.3 |
| 7,296,774 B2 * | 11/2007 | Oh | .............. | 248/324 |
| 7,299,526 B2 * | 11/2007 | Kim | ............................ | 16/367 |
| 7,380,314 B2 * | 6/2008 | Hung | ........................ | 16/367 |
| 7,492,579 B2 * | 2/2009 | Homer et al. | ............ | 312/223.1 |
| 7,513,013 B2 * | 4/2009 | Hsieh | .......................... | 16/367 |
| 7,526,835 B2 * | 5/2009 | Chen | .......................... | 16/340 |
| 2004/0066614 A1 * | 4/2004 | Hong | ........................ | 361/683 |
| 2006/0037175 A1 * | 2/2006 | Hyun | .......................... | 16/221 |
| 2006/0112519 A1 * | 6/2006 | Harmon et al. | ............... | 16/367 |

(Continued)

*Primary Examiner*—Jayprakash N Gandhi
*Assistant Examiner*—Adrian S Wilson
(74) *Attorney, Agent, or Firm*—Frank R. Niranjan

(57) ABSTRACT

An exemplary double hinge assembly (30) includes a first hinge subassembly (31), a second hinge subassembly (32), a first bracket (35), a second bracket (36) and a connecting member. The first hinge subassembly (31) includes a first rotatable pivot shaft (311). The second hinge subassembly (32) includes a second rotatable pivot shaft (321). The first bracket (35) is fixed to the first rotatable pivot shaft (311), and the second bracket (36) is fixed to the second rotatable pivot shaft (321). The first hinge subassembly (31) and the second hinge subassembly (32) are rotatably mounted to the connecting member respectively. A rotating axis of the first rotatable pivot shaft (311) is substantially parallel to a rotating axis of the second rotatable pivot shaft (321). In addition, an electronic device (50) using the double hinge assembly (30) is also provided.

19 Claims, 7 Drawing Sheets

U.S. PATENT DOCUMENTS

| | | | |
|---|---|---|---|
| 2006/0117527 A1* | 6/2006 | Tu et al. | 16/303 |
| 2006/0279920 A1* | 12/2006 | Lee et al. | 361/683 |
| 2007/0050946 A1* | 3/2007 | Shih et al. | 16/367 |
| 2007/0121303 A1* | 5/2007 | Wang et al. | 361/752 |
| 2007/0146975 A1* | 6/2007 | Chen et al. | 361/680 |

* cited by examiner

DOUBLE HINGE ASSEMBLY AND ELECTRONIC DEVICE USING THE SAME

BACKGROUND OF THE INVENTION

1. Field of the Invention

The present invention relates generally to hinge assemblies and electronic devices using the same, more particularly to a double hinge assembly and an electronic device using the same.

2. Discussion of the Related Art

Clamshell designed electronic devices such as mobile phones, notebook computers, or personal digital assistants (PDAs) generally has a main body and a cover. The cover is pivotally mounted on the main body via a hinge. A typical hinge includes a first cam, a second cam, a spring, and an O-shaped ring. A shaft extends from a center of the second cam, and the shaft defines a groove on an outer surface. The first cam defines a central hole. The shaft protrudes through the first cam and the spring, and the O-shaped ring is engaged in the groove of the shaft, thereby the typical hinge is assembled.

With the typical hinge, a cover can be turned about a horizontal axis in order to change a viewing angle. However, if a user wants to take a picture of himself using the mobile phone, the user cannot see the displayed image because the camera lens and the display are located at opposite sides of the cover. Therefore, the user cannot properly aligned or adjust the image shown on the display, resulting in a misaligned image. In addition, if the display of the mobile phone is a touch panel display, the person needs to use one hand to hold the main body and the other hand to touch the camera icon, on the display, to take the picture. Thus, the mobile phone with the typical hinge is quite inconvenient for use.

Therefore, a double hinge assembly and an electronic device using the same to solve the aforementioned problems is desired.

SUMMARY

An exemplary double hinge assembly includes a first hinge subassembly, a second hinge subassembly, a first bracket, second bracket and a connecting member. The first hinge subassembly includes a first rotatable pivot shaft. The second hinge subassembly includes a second rotatable pivot shaft. The first bracket is fixed to the first rotatable pivot shaft, and the second bracket is fixed to the second rotatable pivot shaft. The first hinge subassembly and the second hinge subassembly are rotatably mounted to the connecting member respectively. A rotating axis of the first rotatable pivot shaft is substantially parallel to a rotating axis of the second rotatable pivot shaft.

Another exemplary double hinge assembly includes a first hinge subassembly, a second hinge subassembly, a first bracket, a second bracket and a first connecting member and a second connecting member. The first hinge subassembly includes a first rotatable pivot shaft. The second hinge subassembly includes a second rotatable pivot shaft. The first bracket is fixed to the first rotatable pivot shaft, and the second bracket is fixed to the second rotatable pivot shaft. The connecting member defines a first pivot hole and a second pivot hole. The first rotatable pivot shaft extends through the first pivot hole of the connecting member. The second rotatable pivot shaft extends through the second pivot hole of the connecting member.

An exemplary electronic device includes a main body, a cover, and a double hinge assembly. The double hinge assembly is one of the hinge assemblies as described in the previous two paragraphs. The cover has a display body. The double hinge assembly connects the main body and the cover such that the cover is rotatable around two horizontal axes relative to the main body.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hinge assembly and the electronic device using the same. Moreover, in the drawings, like reference numerals designate corresponding parts throughout the several views.

DETAILED DESCRIPTION OF THE EMBODIMENTS

The present double hinge assembly can be used in electronic devices such as mobile phones, notebook computers and personal digital assistants. For the purposes of conveniently describing an exemplary application of the hinge assembly, a preferred embodiment of the double hinge assembly as used in a mobile phone is described and illustrated.

Figure 1:
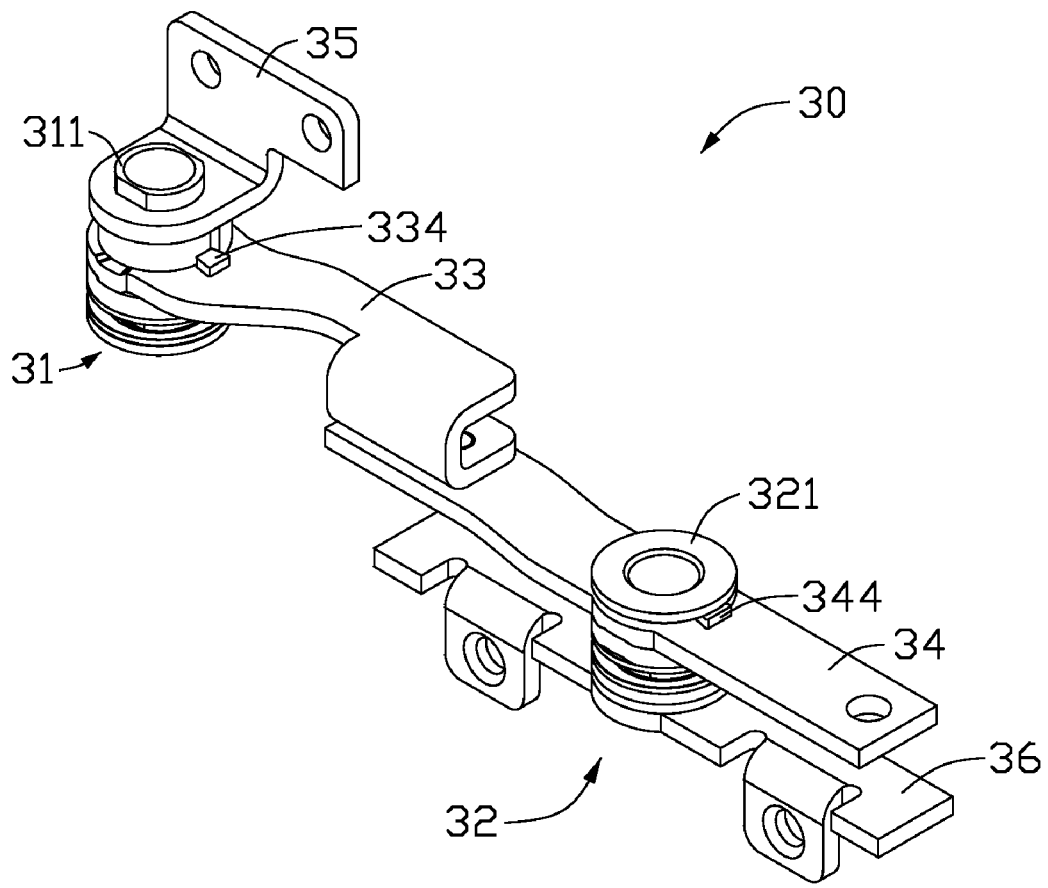
FIG. 1 is an isometric view of a hinge assembly in accordance with a preferred embodiment of the present application.
Figure 2:
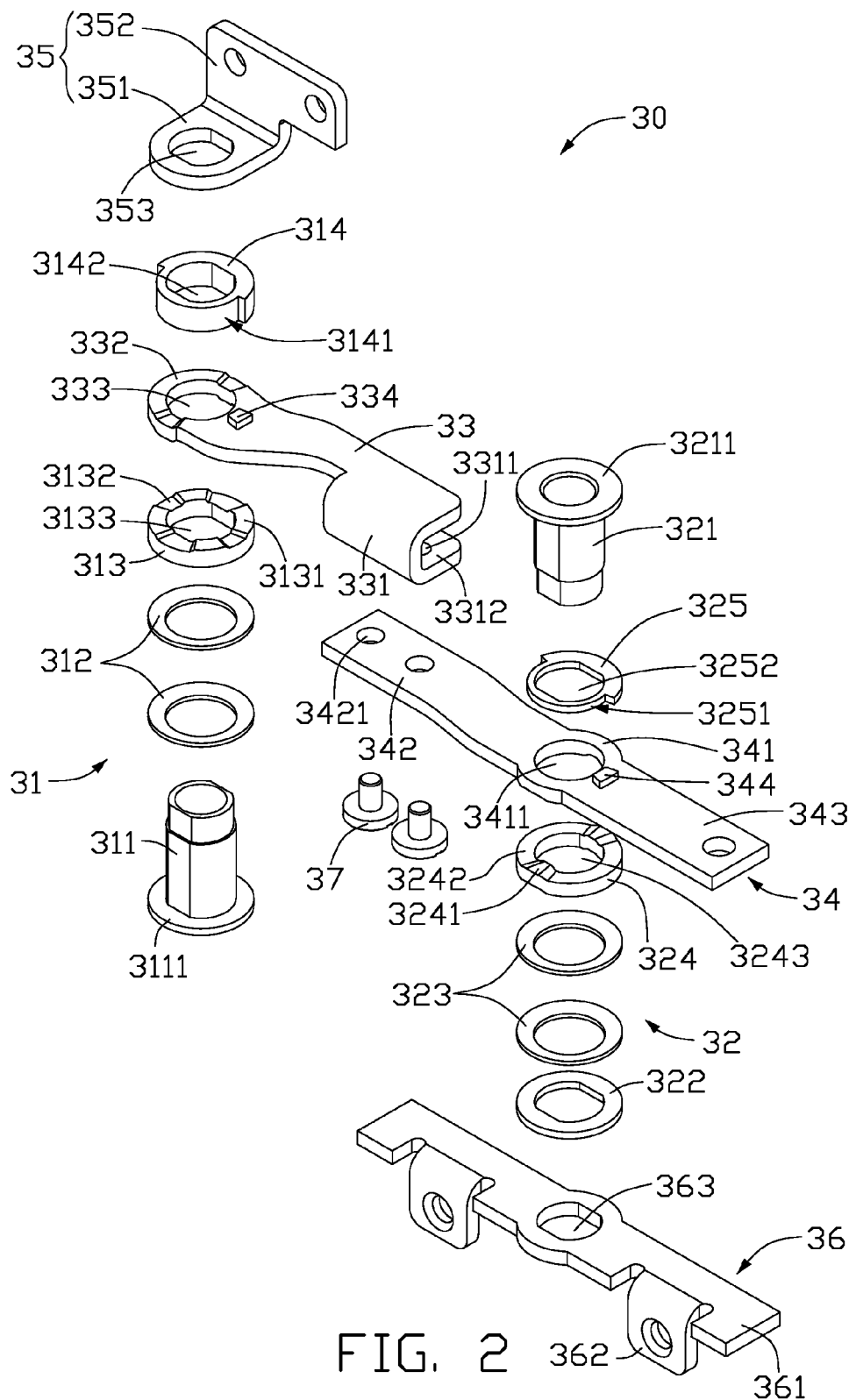
FIG. 2 is an exploded, isometric view of the hinge assembly of FIG. 1.

Referring to the drawings in detail, FIGS. 1 and 2 show a double hinge assembly 30 of one exemplary embodiment of the present invention. The double hinge assembly 30 includes a first hinge subassembly 31, a second hinge subassembly 32, a first connecting member 33, a second connecting member 34, a first bracket 35, a second bracket 36, and two fastening elements 37.

The first hinge subassembly 31 includes a first rotatable pivot shaft 311, a pair of spring washers 312, a first cam 313, and a limiting ring 314. The first rotatable pivot shaft 311 is substantially a hollow shaft, and a flange 3111 is formed around an end of the first rotatable pivot shaft 311. A cross-section of the first rotatable pivot shaft 311 perpendicular to an axis of the first rotatable pivot shaft 311 is double-D shaped. The first cam 313 is approximately a hollow cylinder, and a center of the first cam 313 defines a first cam pivot hole 3133. The first cam pivot hole 3133 is a double-D shaped hole corresponding to the first rotatable pivot shaft 311. The first cam 313 defines four depressions 3132 in a top engaging surface 3131. The limiting ring 314 defines a limiting guide groove 3141 in the cylindrical surface, and a center hole 3142 through the center. The center hole 3142 is a double-D shaped hole corresponding to the first rotatable pivot shaft 311. The spring washers 312, the first cam 313, and the limiting ring 314 are configured to sleeve on the first rotatable pivot shaft 311. The first cam 313 and the limiting ring 314 are non-rotatable relative to the first rotatable pivot shaft 311.

The second hinge subassembly 32 includes a second rotatable pivot shaft 321, a flat washer 322, a pair of spring washers 323, a second cam 324, and a limiting piece 325. The second rotatable pivot shaft 321 is substantially a hollow shaft, and a flange 3211 is formed around an end of the second rotatable pivot shaft 321. A cross-section of the second rotatable pivot shaft 321 perpendicular to an axis of the second rotatable pivot shaft 321 is double-D shaped. The second cam 324 is approximately a ring. A center of the second cam 324 defines a second cam pivot hole 3243. The second cam pivot hole 3243 is a double-D shaped hole corresponding to the second rotatable pivot shaft 321. The second cam 324 defines two protrusions on opposite sides of a top engaging surface 3242. The limiting piece 325 defines a limiting guide groove 3251 in the cylindrical surface, and a center hole 3252 through the center. The central hole 3252 is a double-D shaped hole corresponding to the second rotatable pivot shaft 321. The flat washer 322, the spring washers 323, the second cam 324, and the limiting piece 325 are configured to sleeve on the second rotatable pivot shaft 321. The flat washer 322, the second cam 324 and the limiting piece 325 are non-rotatable relative to the second rotatable pivot shaft 321.

The first connecting member 33 has a C-shape attaching portion 331 formed at one end of the first connecting member 33, and a pivot socket 332 formed at another end of the first connecting member 33. The C-shape attaching portion 331 includes two side plates 3312 separated from each other at a predetermined distance. The C-shape attaching portion 331 defines two mounting holes 3311 in one of the side plates 3312. The pivot socket 332 defines a circular pivot hole 333 in a center. Two teeth 3321 extend out of a bottom surface of the pivot socket 332 and configured for engaging with the engaging surface 3131 of the first cam 313. The first connecting member 33 also forms a limiting protrusion 334 adjacent to the pivot hole 333 at a top surface, and is slidable along the limiting guide groove 3141 of the limiting ring 314.

The second connecting member 34 includes a pivot socket 341 and two arms 342, 343. The two arms 342, 343 extend from two opposite sides of the pivot socket 341. A center of the pivot socket 341 defines a circular hole 3411. The pivot socket 341 defines two depressions (not labeled) in a bottom surface for engaging with the engaging surface 3242 of the second cam 324. The arm 342 defines two fixing holes 3421. Two fastening elements 37 protrude through the fixing holes 3421 of the arm 342 and the mounting holes 3311 of the C-shape attaching portion 331, in order for connecting the first connecting member 33 to the second connecting member 34. The second connecting member 34 also forms a limiting projection 344 adjacent to the circular hole 3411 at a top surface thereon, and the limiting projection 344 can slide along the limiting guide groove 3251 of the limiting piece 325.

The first bracket 35 includes a pivotal plate 351 and a mounting plate 352. The pivotal plate 351 perpendicularly extends from one side of the mounting plate 352. A center of the pivotal plate 351 defines a pivotal hole 353. The pivotal hole 353 is a double-D shaped hole corresponding to the first rotatable pivot shaft 311. The mounting plate 352 is configured for connecting the double hinge assembly 30 to a main body of the electronic device.

The second bracket 36 includes a sheet portion 361 defining an assembling hole 363 in a center. The assembling hole 363 is a double-D shaped hole corresponding to the second rotatable pivot shaft 321. The sheet portion 361 perpendicularly forms a pair of connecting pieces 362 at a same side. The connecting pieces 362 are configured for connecting the double hinge assembly 30 to a cover of the electronic device.

Figure 3:
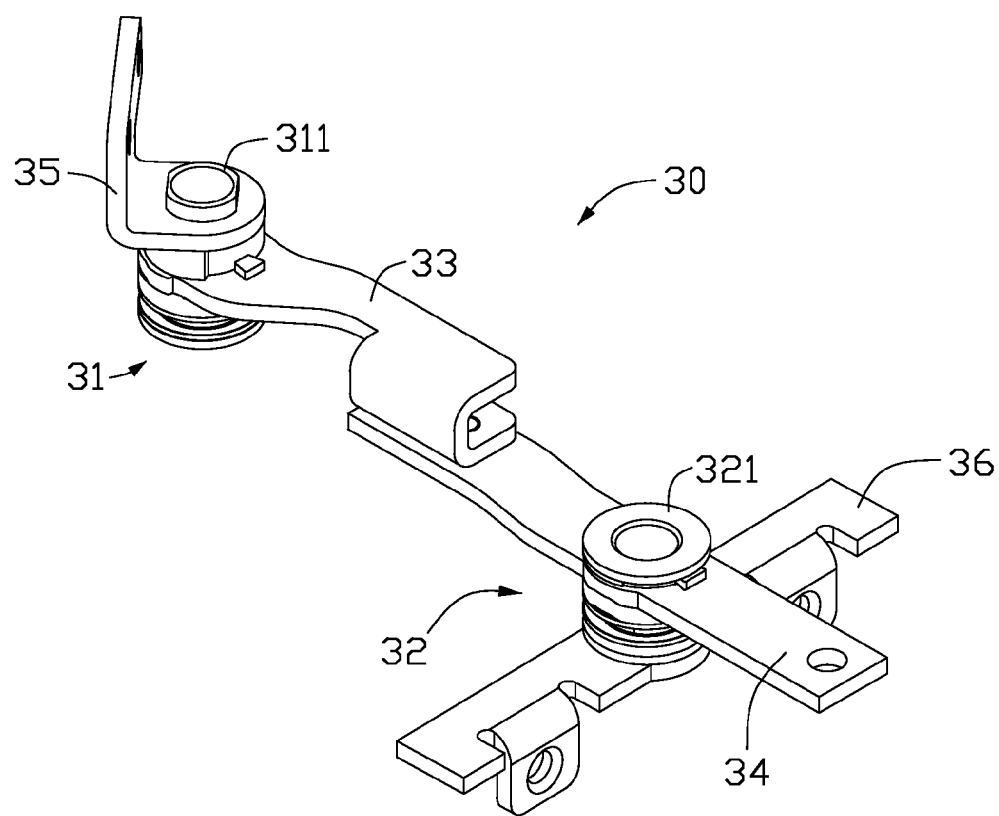
FIG. 3 is an isometric view of the hinge assembly of FIG. 1, showing the first bracket and second bracket rotated a predetermined angle relative to the connecting members.
Figure 4:
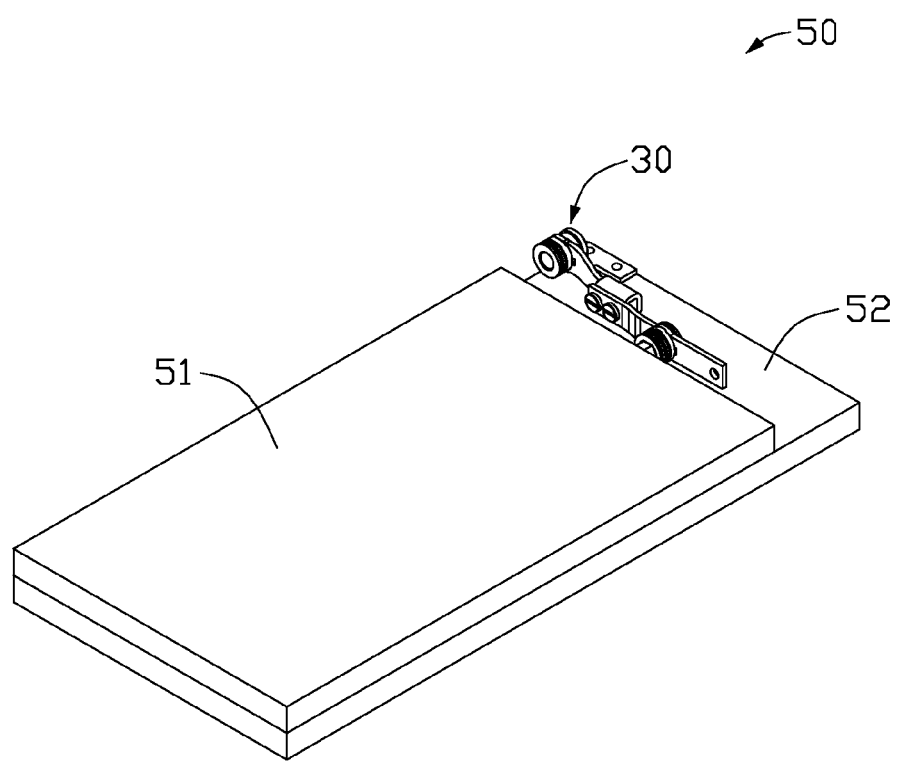
FIG. 4 is an isometric view of the mobile phone in a first closed state in accordance with a preferred embodiment of the present application.
Figure 5:
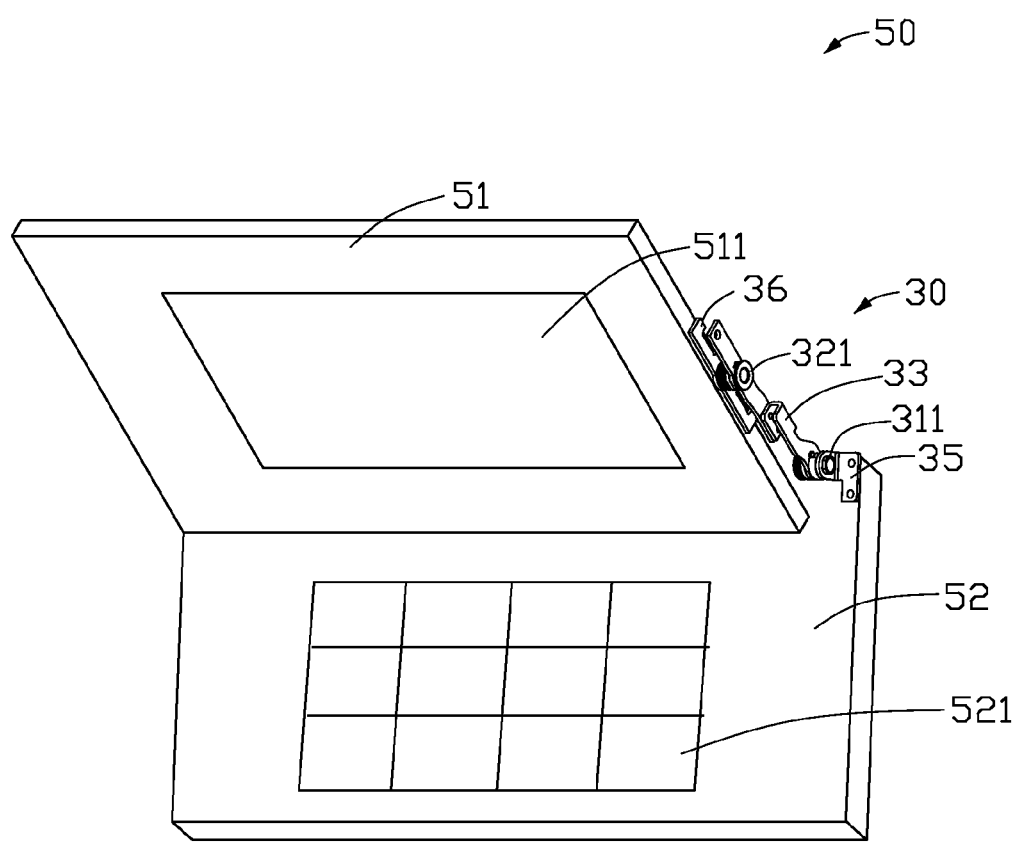
FIG. 5 is an isometric view of the mobile phone of FIG. 4, showing a cover of the mobile phone about a first rational shaft.
Figure 6:
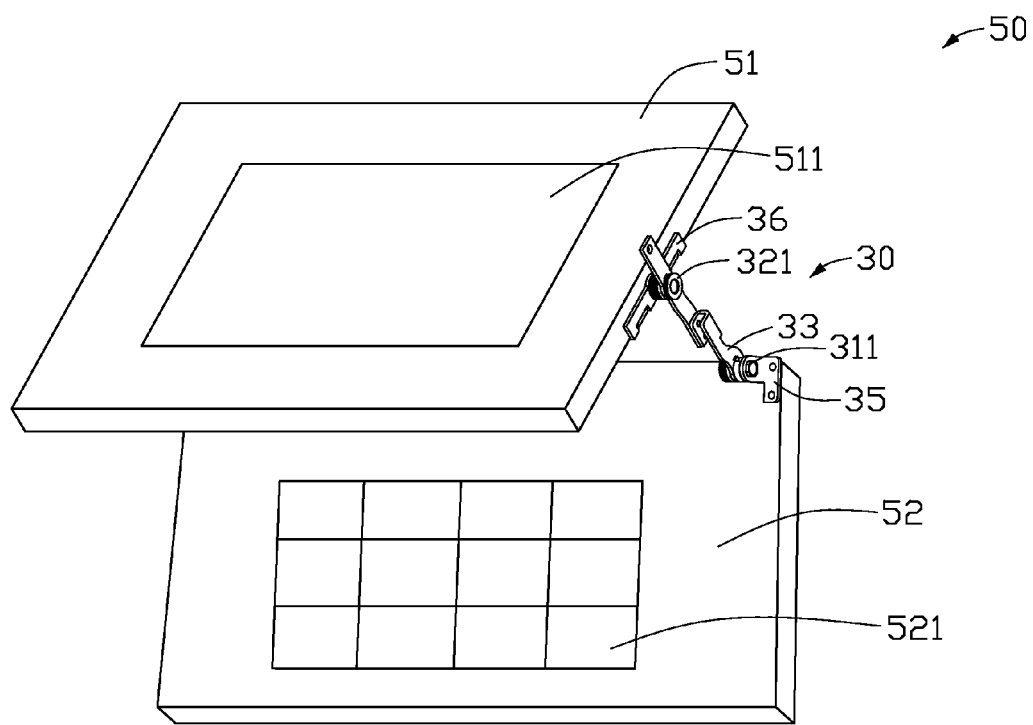
FIG. 6 is an isometric view of the mobile phone of FIG. 5, showing a cover of the mobile phone rotating through an angle about a second rational shaft.

Referring to FIGS. 1 through 3, in assembly of the double hinge assembly 30, the first connecting member 33 and the second connecting member 34 are attached together by the fastening elements 37. The first rotatable pivot shaft 311 is inserted through the spring washer 312, the first cam 313, first connecting member 33, limiting ring 314, and engaged with the first bracket 35. The second rotatable pivot shaft 321 is inserted through the limiting piece 325, the second connecting member 34, the second cam 324, the spring washers 323, the flat washer 322, and finally engaged with the second bracket 36.

After the double hinge assembly 30 is assembled, a rotating axis of the first rotatable pivot shaft 311 is substantially parallel to a rotating axis of the second rotatable pivot shaft 321. The first bracket 35 is rotatable together with the first rotatable pivot shaft 311 relative to the first connecting member 33. The limiting protrusion 334 of the first connecting member 33 slides in the limiting guide groove 3141 of the limiting ring 314, in order to define a largest rotating angle between the first connecting member 33 and the first bracket 35. In addition, since the two teeth 3321 on the pivot socket 332 engage with the engaging surface 3131 of the first cam 313, the first rotatable pivot shaft 311 halts once rotating through an angle of 90 degrees relative to the first connecting member 33. The second bracket 36 can rotate on the second rotatable pivot shaft 321 relative to the second connecting member 34. The limiting projection 344 of the second connecting member 34 slides in the limiting guide groove 3251 of the limiting piece 325, in order to define a largest rotating angle between the second connecting member 34 and the second bracket 36. Furthermore, since the two depressions on the mounting portion 341 are engaged with the engaging surface 3242 of the second cam 324, the second rotatable pivot shaft 321 halts once rotating to an angle of 180 degrees relative to the second connecting member 34.

When the first bracket 35 is rotated relative to the first connecting member 33 about the first rotatable pivot shaft 311, the first rotatable pivot shaft 311 will rotate along with the first bracket 35. Since the first cam 313 and the limiting ring 314 is non-rotatable relative to the first rotatable pivot shaft 311, the first cam 313 and the limiting ring 314 also rotate in company with the first rotatable pivot shaft 311. The first bracket 35 and the first rotatable pivot shaft 311 keep rotating until the limiting protrusion 334 reaches ends of the limiting guide groove 3141 of the limiting ring 314. When the second bracket 36 rotates relative to the second connecting member 34 about the second rotatable pivot shaft 321, the second rotatable pivot shaft 321 rotates in company with the second bracket 36. Since the flat washer 322, the second cam 324 and the limiting piece 325 is non-rotatable relative to the second rotatable pivot shaft 321, the flat washer 322, the second cam 324 and the limiting piece 325 also rotate in company with the second rotatable pivot shaft 321. The second bracket 36 and the second rotatable pivot shaft 321 keep rotating until the limiting projection 344 reaches ends of the limiting guide groove 3251 of the limiting piece 325.

Referring to FIGS. 4 through 7, the mobile phone 50 includes a cover 51, a main body 52, and the double hinge assembly 30 biaxially pivotally connecting the main body 52 and the cover 51. The main body 52 has a keypad 521. The cover 51 has a display body 511. The first bracket 35 is fixed to the main body 52, and the second bracket 36 is fixed to the display body 511. The cover 51 can be turned relative to the main body 52 via the rotation of the first connecting member 33 relative to the axis of the first rotatable pivot shaft 311. The cover 51 can also be rotated relative to the main body 52 via the rotation of the second connecting member 34 relative to the axis of the second rotatable pivot shaft 321. The mobile phone 50 also includes a camera that disposed on the cover 51 to take photos.

Figure 7:
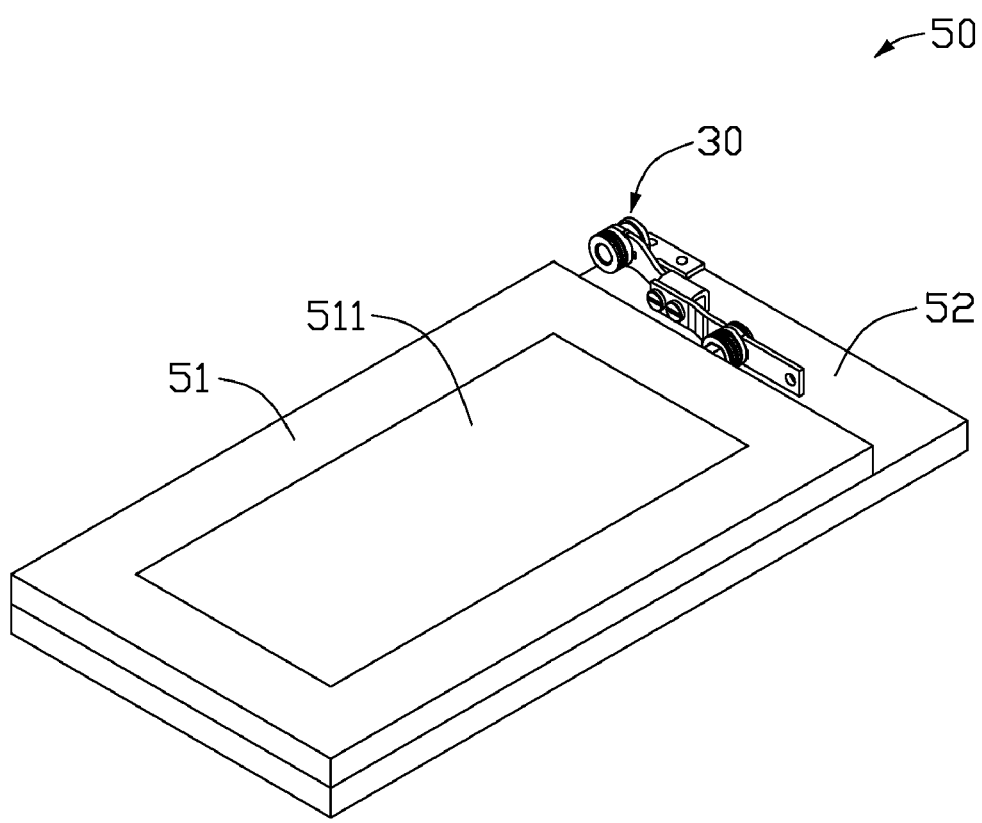
FIG. 7 is an isometric view of the mobile phone of FIG. 6, showing the mobile phone in a second close state with a display body of the cover facing to a user.

When a user wants to take photos of oneself with the mobile phone 50, the user only needs to turn the cover 51 to a predetermined angle together with the second hinge subassembly 32, the first connecting member 33, the second connecting member 34 and the second bracket 36 relative to the axis of the first rotatable pivot shaft 311. Subsequently, the user can turn the cover 51 to 180 degrees together with the second bracket 36 relative to the axis of the second rotatable pivot shaft 321, then, the user can take photos of oneself while viewing a pre-captured image on the display body 511. Therefore, the user can view the display body 511 and adjust positions of the mobile phone 50 to take a high quality photo. Furthermore, the cover 51 can fold over the main body 52 such that the display body 511 faces outwards (as shown in FIG. 7). In addition, if the display body 511 is a touch panel, the user can place the mobile phone 50 on a table and operate the display body 511 using one hand only, thus no need to use the other hand to hold the main body. Therefore, the mobile phone 50 is convenient for the user to operate.

The first connecting member 33 and the second connecting member 34 are spaced at a predetermined distance along a direction the first rotatable pivot shaft 311 extending in, due to the C-shape attaching portion 331 of the first connecting member 33. Thus, the cover 51 cannot collide with the first rotatable pivot shaft 311 resulting in wear and tear. In an alternative embodiment, the C-shape attaching portion 331 can be replaced by a plurality of washers.

It should be understood that, the first connecting member 33 and the second connecting member 34 can be replaced by one connecting member. The connecting member has two pivot holes defined in two ends thereof respectively. Furthermore, the cross-sections of the first rotatable pivot shaft 311 and the second rotatable pivot shaft 321 can be other shape, such as hexagon shaped. Accordingly, a corresponding cam or a corresponding limiting ring also defines a hexagonal hole therein.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A double hinge assembly, comprising:
    a first hinge subassembly comprising a first rotatable pivot shaft;
    a second hinge subassembly comprising a second rotatable pivot shaft;
    a first bracket fixed to the first rotatable pivot shaft;
    a second bracket fixed to the second rotatable pivot shaft; and
    a connecting member, wherein the first hinge subassembly and the second hinge subassembly are rotatably mounted to the connecting member, and a rotating axis of the first rotatable pivot shaft is substantially parallel to a rotating axis of the second rotatable pivot shaft;
    wherein the first hinge subassembly comprises a first cam and a limiting ring located at opposite sides of the connecting member, the first cam non-rotatably sleeved on the first rotatable pivot shaft, and the first cam has an engaging surface engaging with the connecting member, the limiting ring non-rotatably sleeved on the first rotatable pivot shaft, the limiting ring defines a limiting guide groove in the cylindrical surface, the connecting member forms a limiting protrusion, and the limiting protrusion is configured to be slidable in the limiting guide groove of the limiting ring defining a range of first angular rotation between the first rotatable pivot shaft and the connecting member.

2. The double hinge assembly as claimed in claim 1, wherein the first rotatable pivot shaft comprises a flange formed around an end thereof, the connecting member defines a first pivot hole, and the first rotatable pivot shaft is extended through the first pivot hole of the connecting member.

3. The double hinge assembly as claimed in claim 1, wherein the first hinge subassembly further comprises at least one spring washer sleeved on the first rotatable pivot shaft.

4. The double hinge assembly as claimed in claim 2, wherein the second rotatable pivot shaft comprises a flange formed around an end thereof, the connecting member further defines a second pivot hole therein, and the second rotatable pivot shaft is extended through the second pivot hole of the connecting member.

5. The double hinge assembly as claimed in claim 4, wherein the second hinge subassembly further comprises a second cam sleeved on the second rotatable pivot shaft, and the second cam has an engaging surface engaging with the connecting member.

6. The double hinge assembly as claimed in claim 5, wherein the second hinge subassembly further comprises a limiting piece, the limiting piece defines a limiting guide groove in the cylindrical surface, the connecting member forms a limiting projection thereon adjacent to the second pivot hole, and the limiting projection is configured to be slidable in the limiting guide groove of the limiting piece defining a range of second angular rotation between the second rotatable pivot shaft and the connecting member.

7. The double hinge assembly as claimed in claim 1, wherein the second hinge subassembly further comprises at least one spring washer sleeved on the second rotatable pivot shaft.

8. The double hinge assembly as claimed in claim 1, wherein at least one of the first rotatable pivot shaft and the second rotatable pivot shaft is a hollow shaft.

9. The double hinge assembly as claimed in claim 1, wherein the connecting member comprises a first connecting member and a second connecting member fixed to the first connecting member, the first connecting member and the second connecting member space at a predetermined distance along a direction the first rotatable pivot shaft extending in, the first connecting member defines a first pivot hole, and the second connecting member defines a second pivot hole.

10. A double hinge assembly, comprising:
    a first hinge subassembly comprising a first rotatable pivot shaft;
    a second hinge subassembly comprising a second rotatable pivot shaft;
    a first bracket fixed to the first rotatable pivot shaft;
    a second bracket fixed to the second rotatable pivot shaft; and
    a connecting member; wherein the connecting member defines a first pivot hole and a second pivot hole, the first rotatable pivot shaft extends through the first pivot hole of the connecting member, and the second rotatable pivot shaft extends through the second pivot hole of the connecting member;

wherein the first hinge subassembly comprises a first cam and a limiting ring located at opposite sides of the connecting member, the first cam non-rotatable sleeved on the first rotatable pivot shaft, and the first cam has an engaging surface engaging with the connecting member, the limiting ring non-rotatably sleeved on the first rotatable pivot shaft, the limiting ring defines a limiting guide groove in the cylindrical surface, the connecting member forms a limiting protrusion, and the limiting protrusion is configured to be slidable in the limiting guide groove of the limiting ring defining a range of first angular rotation between the first rotatable pivot shaft and the connecting member.

11. The double hinge assembly as claimed in claim 10, wherein both the first rotatable pivot shaft and the second rotatable pivot shaft comprise a flange formed around an end thereof.

12. The double hinge assembly as claimed in claim 10, wherein the second hinge subassembly further comprises a second cam sleeved on the second rotatable pivot shaft, and the second cam has an engaging surface engaging with the connecting member.

13. The double hinge assembly as claimed in claim 12, wherein the second hinge subassembly further comprises a limiting piece, the limiting piece defines a limiting groove on a side surface, the connecting member forms a limiting projection thereon next to the second pivot hole, and the limiting projection is configured to be slidable in the limiting guide groove of the limiting piece defining a range of second angular rotation between the second rotatable pivot shaft and the connecting member.

14. An electronic device comprising:

a main body;

a cover having a display body; and a double hinge assembly connecting the main body and the cover such that the cover is rotatable around two horizontal axes relative to the main body, the hinge assembly comprising:

a first hinge subassembly comprising a first rotatable pivot shaft;

a second hinge subassembly comprising a second rotatable pivot shaft;

a first bracket fixed to the first rotatable pivot shaft;

a second bracket fixed to the second rotatable pivot shaft; and a connecting member, wherein the first hinge subassembly and the second hinge subassembly are rotatably mounted to the connecting member respectively, and a rotating axis of the first rotatable pivot shaft is substantially parallel to a rotating axis of the second rotatable pivot shaft;

wherein the first hinge subassembly comprises a first cam and a limiting ring located at opposite sides of the connecting member, the first cam non-rotatably sleeved on the first rotatable pivot shaft, and the first cam has an engaging surface engaging with the connecting member, the limiting ring non-rotatably sleeved on the first rotatable pivot shaft, the limiting ring defines a limiting guide groove in the cylindrical surface, the connecting member forms a limiting protrusion, and the limiting protrusion is configured to be slidable in the limiting guide groove of the limiting ring defining a range of first angular rotation between the first rotatable pivot shaft and the connecting member.

15. The electronic device as claimed in claim 14, wherein the first rotatable pivot shaft comprises a flange formed at an end thereof, the connecting member defines a first pivot hole, and the first rotatable pivot shaft is extended through the first pivot hole of the connecting member.

16. The electronic device as claimed in claim 15, wherein the second rotatable pivot shaft comprises a flange formed at one end, the connecting member further defines a second pivot hole therein, and the second rotatable pivot shaft is extended through the second pivot hole of the connecting member.

17. The double hinge assembly as claimed in claim 1, wherein the first bracket comprises a pivotal plate and a mounting plate perpendicularly extending from one side of the pivotal plate, the pivotal plate is fixed to an end of the first rotatable pivot shaft; the second bracket comprises a sheet portion and a pair of connecting pieces perpendicularly formed at a same side of the sheet portion, the sheet portion is fixed to an end of the second rotatable pivot shaft.

18. The double hinge assembly as claimed in claim 10, wherein the first bracket comprises a pivotal plate and a mounting plate perpendicularly extending from one side of the pivotal plate, the pivotal plate is fixed to an end of the first rotatable pivot shaft; the second bracket comprises a sheet portion and a pair of connecting pieces perpendicularly formed at a same side of the sheet portion, the sheet portion is fixed to an end of the second rotatable pivot shaft.

19. The electronic device as claimed in claim 14, wherein the first bracket comprises a pivotal plate and a mounting plate perpendicularly extending from one side of the pivotal plate, the pivotal plate is fixed to an end of the first rotatable pivot shaft, the mounting plate is fixed to a top surface of the main body; the second bracket comprises a sheet portion and a pair of connecting pieces perpendicularly formed at a same side of the sheet portion, the sheet portion is fixed to an end of the second rotatable pivot shaft, the connecting pieces are fixed to a side surface of the cover.

* * * * *